(12) United States Patent
Apolloni et al.

(10) Patent No.: US 8,749,256 B2
(45) Date of Patent: Jun. 10, 2014

(54) MEASUREMENT SYSTEM

(75) Inventors: Marco Apolloni, Balgach (CH); Jean Randhahn, Berschis (CH)

(73) Assignee: Tel Solar AG, Trubbach (CH)

( * ) Notice: Subject to any disclaimer, the term of this patent is extended or adjusted under 35 U.S.C. 154(b) by 936 days.

(21) Appl. No.: 12/874,247

(22) Filed: Sep. 2, 2010

(65) Prior Publication Data

US 2011/0089960 A1    Apr. 21, 2011

Related U.S. Application Data

(60) Provisional application No. 61/239,520, filed on Sep. 3, 2009.

(51) Int. Cl.
*G01R 31/26* (2014.01)

(52) U.S. Cl.
USPC ............. 324/750.16; 324/754.08; 324/761.01

(58) Field of Classification Search
USPC ...................................... 324/760.01–762.01
See application file for complete search history.

(56) References Cited

U.S. PATENT DOCUMENTS

| | | | |
|---|---|---|---|
| 4,401,524 A * | 8/1983 | Augis et al. .................... 205/227 |
| 4,712,063 A * | 12/1987 | Osterwald et al. ........ 324/761.01 |
| 4,891,584 A * | 1/1990 | Kamieniecki et al. ... 324/754.23 |
| 6,639,421 B1 * | 10/2003 | Yoshino et al. .......... 324/761.01 |
| 7,733,111 B1 * | 6/2010 | Zhao et al. ............... 324/761.01 |

* cited by examiner

*Primary Examiner* — Minh N Tang
(74) *Attorney, Agent, or Firm* — Pearne & Gordon LLP (57) ABSTRACT

The invention discloses a contacting device for a thin film solar cell, comprising a positioning plane for positioning the solar cell thereon, a contact element for electrically contacting the solar cell and a suction element, wherein the solar cell is arrangeable on the top side of the positioning plane, the contact element is arranged slideably in a direction orthogonal to the positioning plane and arranged slideably through an opening of the positioning plane, and the suction element is arranged on the bottom side of the positioning plane for sucking air through the opening. The contacting device allows for obtaining improved measurement accuracy.

17 Claims, 6 Drawing Sheets

MEASUREMENT SYSTEM

TECHNICAL FIELD

The invention relates to the field of sun simulator measurement systems. Particularly, the invention relates to a contacting device for a thin film solar cell for a measurement system and to the measurement system for the solar cell, comprising the contacting device.

BACKGROUND ART

Sun simulators are widely used in the photovoltaic (PV) industry for the electrical characterization of solar cells and modules. With the help of artificial light, the solar spectra AM1.5G, or others, are approximated. A complete sun simulator measurement system needs to incorporate specific components beside the light source to assure very accurate current-voltage measurements. While there exists many different light sources in the prior art, there is hardly any solution for delivering accurate sun simulator measurement results, especially for the thin film silicon PV application.

The light spectra, the light homogeneity and the temporal stability of a light source is critical, but the same accounts for electrical contacting, without destroying the front and/or back transparent conductive oxide (TCO) contact of the solar cell, the accurate temperature distribution and control of the device under test (DUT), the low current switching and measuring and many other factors that must be fulfilled.

Some of the main disadvantages of sun simulators know in the prior art lie in the limited accuracies of the measurement systems. Beside that, most of the measurement systems used, are developed in the laboratory and do not fulfil the requirements of a photovoltaic production line environment, i.e. the sun simulators are to complex, difficult to calibrate and/or difficult to maintain.

DISCLOSURE OF INVENTION

It is an object of the invention to provide a measurement system for a thin film solar cell that provides improved measurement accuracy.

This object is achieved by the features of the independent claims. Preferred embodiments of the present invention are defined in the dependent claims.

Accordingly, the object is achieved by a contacting device for a thin film solar cell, comprising a positioning plane for positioning the solar cell thereon, a contact element for electrically contacting the solar cell and a suction element, wherein the solar cell is arrangeable on the top side of the positioning plane, the contact element is arranged slideably in a direction orthogonal to the positioning plane and arranged slideably through an opening of the positioning plane, and the suction element is arranged on the bottom side of the positioning plane for sucking air through the opening.

Hence, it is an essential idea of the invention to provide a contacting device, preferably for a thin film solar cell measurement system, wherein the solar cell can be positioned on the positioning plane, for example on a plane panel, for conducting current and/or voltage measurements of the solar cell, without destroying a front and/or a back TCO contact of the solar cell when electrically contacting the solar cell. As the solar cell is arrangeable on the top side of the positioning plane, while the contact element is adapted for contacting the solar cell from the bottom side of the positioning plane and through the positioning plane towards the top side of the positioning plane, and while the sucking element is adapted for sucking air through the opening that is used by the contact element for applying electrical contact through the positioning plane, these means result in a contacting device that allows for very accurate and simple electrical contacting of the solar cell and result in turn in very accurate measurement results.

The thin film solar cell can be any solar cell known from the prior art, for example a a-Si:H and/or a-Si:H/µc-Si:H solar cell and/or module. Having contacted the solar cell arranged on the contacting device by the contact element through the opening of the positioning plane, electrical parameters of the solar cell such as, for example, short circuit current ($I_{sc}$), short circuit current density ($J_{sc}$), open circuit voltage ($V_{oc}$), power at maximum power point ($P_{mpp}$ or $P_{max}$), current at maximum power point ($I_{mpp}$), voltage at maximum power point ($V_{mpp}$), fill factor (FF), efficiency ($\eta$), serial resistance ($R_s$), shunt or parallel resistance ($R_{sh}$ or $R_p$) can be measured.

Preferably, the solar cell is contacted by a plurality of contact elements such that, for example, a four wire technique can be used for measuring the electrical parameters of the solar cell. As the suction element is adapted for sucking air through the opening, very negligible serial resistances can be achieved when contacting the solar cell by using the contacting device according to the invention. Furthermore, the suction element provides for a good temperature homogenity of the solar cell, which results in an improved measurement accuracy over prior art systems.

According to a preferred embodiment of the invention, the contact element is adapted for contacting the solar cell when the solar cell is arranged on the top side of the positioning plane and when the suction unit sucks air through the opening. Accordingly, it is preferred that the contact element only contacts the solar cell when the solar cell is arranged on the top side of the positioning plane and when the suction unit is activated such that the suction unit sucks air through the opening.

According to the invention, the contact element is arranged slideably through the positioning element for electrically contacting the solar cell, whereby it is further preferred that the contact element is position controlled i.e. that a means is provided for controlling if the contact element is in electrical contact with the solar cell or not and/or for measuring the position of the contact element relative to the positioning plane. The opening can be provided, for example, as a bore hole within the positioning plane, wherein the contact element is arranged slideably within the bore hole for electrically contacting the solar cell.

Generally, the contact element may comprise any means known the from prior art. However, it is especially preferred that the contact element comprises a golden contact pin for contacting the solar cell. Such an embodiment provides a very low resistance when electrically contacting the solar cell. It is further preferred, that the contact element comprises a tip for electrically contacting the solar cell, wherein the tip is arranged in a first position between the top side and the bottom side of the positioning plane when the solar cell is not arranged on the top side of the positioning plane, and the tip is arranged in a second position within the solar cell when the solar cell is arranged on the top side of the positioning plane.

Preferably, the solar cell comprises a TCO contact for electrically contacting the solar cell, wherein the contact element is adapted for electrically contacting the TCO layer of the solar cell. Accordingly, the tip of the contact element is arranged in a secure position when the tip is in its first position such that the contact pin cannot be damaged as it is provided "below" the top side of the positioning plane, i.e. preferably inside of the positioning plane. When the solar cell is arranged on the top side of the positioning plane, the tip of the contact element can be slided into the second position such that the tip is arranged within the solar cell, i.e. the tip is in electrical contact, for example, with the TCO layer of the solar cell that is provided within the solar cell. When the tip is in its second position, the tip is preferably 3 mm, more preferably 5 mm "above" the top side of the positioning plane. In such manner, the contact element allows for a very accurate and simple contacting of the solar cell without destroying a TCO contact, while on the other hand the contact element is securely provided in a secure position when the solar cell is not arranged on the positioning plane.

It is further preferred, that the tip is arranged in the second position within the solar cell when a solar cell is arranged on the top side of the positioning plane and when the suction element sucks air through the opening. The suction element may comprise any means known from the prior art for sucking air through the opening. According to another embodiment, a metal bellow is provided, the metal bellow is arranged below the bottom side of the positioning plane, wherein the contact element is arranged such wise within the metal bellow that the suction element is arranged for sucking the air out of the metal bellow covering the contact element.

In another preferred embodiment the contact element is adapted for contacting the solar cell when the solar cell is arranged on the top side of the positioning plane and when the suction unit sucks air through the opening, and wherein the contact element comprises a tip for electrically contacting the solar cell, the tip is arranged in a first position between the top side and the bottom side of the positioning plane when the solar cell is not arranged on the top side of the positioning plane, and the tip is arranged in a second position within the solar cell when the solar cell is arranged on the top side of the positioning plane.

According to another preferred embodiment, the contacting device comprises a cover for light-tightly covering the solar cell when arranged on the top side of the positioning plane. The cover can be provided, for example, as a hat, a cap or a cube that is open on one side for covering the solar cell. Such an embodiment allows the measurement of dark current and/or voltage parameters of the solar cell, such as, for example, diode factor (n), dark saturation current ($I_0$) and dark saturation current density ($J_o$).

In another preferred embodiment, the contact element is adapted for contacting the solar cell when the solar cell is arranged on the top side of the positioning plane and when the suction unit sucks air through the opening and wherein the contacting device comprises a cover for light-tightly covering the solar cell when arranged on the top side of the positioning plane It is furthermore according to another embodiment of the invention preferred, that the contacting device comprises a temperature element 18 for cooling and/or for heating the contacting device and a peltier element 19 for measuring the temperature of the contacting device, wherein the temperature element 18 is controlled by the peltier element 19. Such wise, it is preferred that the temperature element 18 is controlled by a proportional-integral, derivative (PID) controller, for example as a closed-loop control. Such mean further improves the accuracy of the measurement.

The object of the invention is further addressed by a measurement system for a thin film solar cell, comprising a contacting device as described before, a light source and a rotating table, wherein the contacting device is arranged on the rotating table such that the top side of the positioning plane of the contacting device is rotatable into the optical path of the light source.

Accordingly, the measurement system allows for a very accurate, reliable and user-friendly measurement of a solar cell, as the solar cell, provided on the top side of the positioning plane, for measuring its characteristics is easily rotatable onto the rotating table into the optical path of the light source. Once the measurement has finished, the rotating table can be rotated such that the solar cell leaves the optical path of the light source, for example for exchanging the solar cell. Once the solar cell has been exchanged, the rotating table can be rotated such wise that the exchanged solar cell is in the optical path of the light source so that the measurement may continue with the exchanged solar cell.

The light source can be any light source known from the prior art for conducting thin film solar cell measurements, for example a class AAA light source with integrated AM1.5G filter. Using such an AAA light source is advantageous as the quality of the light spectra is essential for the measurement quality.

The measurement system may further comprise a graphical user interface as part of a computer system, integral components for exchanging, storing or distribution of measurement results and other means known from the prior art. Such means decrease problems coming from mishandling of the measurement system.

In another preferred embodiment, the contact element is adapted for contacting the solar cell when the solar cell is arranged on the top side of the positioning plane and when the suction unit sucks air through the opening. It is further preferred that the contact element comprises a tip for electrically contacting the solar cell, the tip is arranged in a first position between the top side and the bottom side of the positioning plane when the solar cell is not arranged on the top side of the positioning plane, and the tip is arranged in a second position within the solar cell when the solar cell is arranged on the top side of the positioning plane.

In another preferred embodiment, the contact device comprises a cover for light-tightly covering the solar cell when arranged on the top side of the positioning plane. It is further preferred that the contact element is adapted for contacting the solar cell when the solar cell is arranged on the top side of the positioning plane and when the suction unit sucks air through the opening and wherein the contacting device comprises a cover for light-tightly covering the solar cell when arranged on the top side of the positioning plane In another embodiment of the invention, the measurement system comprises a filter, wherein the filter is arranged in the optical path of the light source. Preferably, a set of 2, 4 or 6 filters are provided, comprising, for example spectral, grey and/or neutral filters, such as KG3, BG7, OG590, RG630, MG4 and/or MG11. It is further preferred, that the filter, preferably each filter, is position controlled and/or the measurement system allows for variable intensity measurements. Providing a filter in the optical path is advantageous as it allows for measuring e.g. specific wavelengths bands and/or with reduced light intensity.

In another embodiment of the invention, the measurement system comprises a reference cell and/or a photo diode array, wherein the reference cell and/or the photo diode array, respectively, is arranged on the rotating table such that the reference cell and/or the photo diode array, respectively, is rotatable into the optical path of the light source. The photo diode array may comprise an array of 9 crystalline photo diodes. Preferably, the reference cell is provided as a crystalline reference cell. The reference cell and/or the photo diode array allow in a simple manner for assuring that the non-uniformity of the measurement system is within specific values, as the reference cell and/or the photo diode array are rotatable into the optical path of the light source for calibrating the measurement system, prior to measuring a solar cell.

In a further preferred embodiment, the measurement system comprises a magnetic positioning holder for positioning the rotating table such that the contacting device is arranged preferably exactly in the optical path of the light source. It is furthermore preferred that the magnetic positioning holder for positioning the rotating table is arranged such that the reference cell and/or the photo diode array is arranged preferably exactly in the optical path of the light source. With the magnetic positioning holder, the rotating table can be positioned in a very simple and reliable manner for ensuring that the contacting device, the reference cell and/or the photo diode array is precisely positioned in the optical path of the light source.

In a further embodiment of the invention, the measurement system comprises a low current switching element for measuring current and/or voltage of the solar cell. Preferably, the low current switching element comprises a means known to the man skilled in the art for performing measurements in the pico-ampere measurement range. Such wise, dark measurements, whereby the solar cell is light-tighly covered by the cover, can be performed.

In another especially preferred embodiment, the measurement system comprises a second contacting device according as described before, a light source and a rotating table, wherein the contacting device is arranged on the rotating table such that the top side of the positioning plane of the contacting device is rotatable into the optical path of the light source and wherein the second contacting device is arranged on the rotating table such that the top side of the second positioning plane of the second contacting device is rotatable into the optical path of the light source.

Accordingly, it is preferred that the measurement system comprises a contacting device for a thin film solar cell, a second contacting device for a second thin film solar cell, a light source and a rotating table, wherein the contacting device comprises a positioning plane for positioning the solar cell thereon, a contact element for electrically contacting the solar cell and a suction element, wherein the solar cell is arrangeable on the top side of the positioning plane, the contact element is arranged slideably in a direction orthogonal to the positioning plane and arranged slideably through an opening of the positioning plane, and the suction element is arranged on the bottom side of the positioning plane for sucking air through the opening, the second contacting device comprises a second positioning plane for positioning the second solar cell thereon, a second contact element for electrically contacting the second solar cell and a second suction element, wherein the second solar cell is arrangeable on the top side of the second positioning plane, the second contact element is arranged slideably in a direction orthogonal to the second positioning plane and arranged slideably through a second opening of the second positioning plane, and the second suction element is arranged on the bottom side of the second positioning plane for sucking air through the second opening, wherein the contacting device is arranged on the rotating table such that the top side of the positioning plane of the contacting device is rotatable into the optical path of the light source and wherein the second contacting device is arranged on the rotating table such that the top side of the second positioning plane of the second contacting device is rotatable into the optical path of the light source.

Such embodiment allows the measurement of two solar cells provided on the rotating table, wherein the two different solar cells are, for example, provided in an angle of 180° distant to each other on the rotating table such that the two different solar cells are rotable alternately into the optical path of the light source.

BRIEF DESCRIPTION OF DRAWINGS

These and other aspects of the invention will be apparent from and elucidated with reference to the embodiments described hereinafter.

In the drawings.

DETAILED DESCRIPTION OF THE EMBODIMENTS

Figure 1:
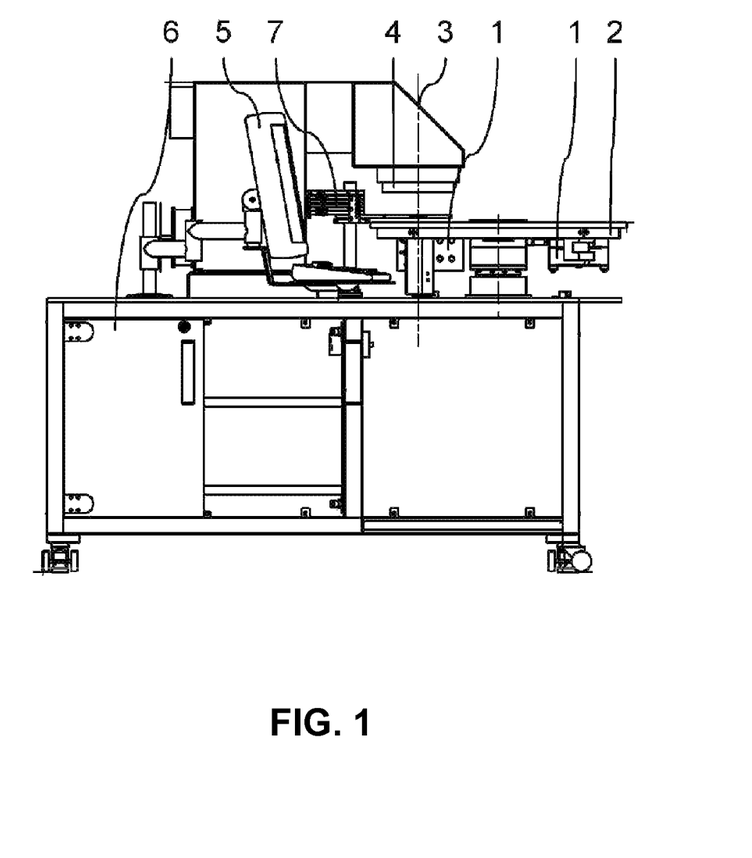
FIG. 1 shows a schematic side view of a measurement system according to a preferred embodiment of the invention.
Figure 2:
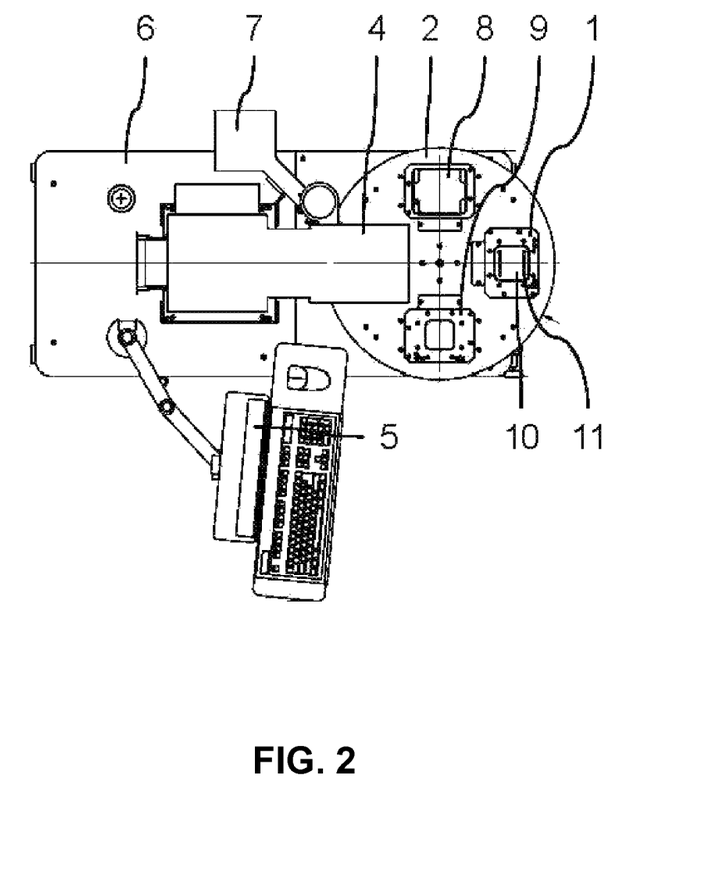
FIG. 2 shows a schematic top view of the measurement system according to the preferred embodiment of the invention.

FIG. 1 and FIG. 2 show a measurement system according to a preferred embodiment of the invention comprising two contacting devices 1 arranged on a rotating table 2 such that the top side of the contacting device 1 is rotatable into the optical path 3 of a light source 4. The measurement system further comprises a graphical user interface 5, i.e. a computer system, further integral components 6 for conducting a measurement and a set of filters 7.

The rotating table 2 further comprises a reference cell 8 and a photo diode 9 array such that the reference cell 8 and/or the photo diode 9 array are rotatable into the optical path 3 of the light source 4 as well.

Figure 3:
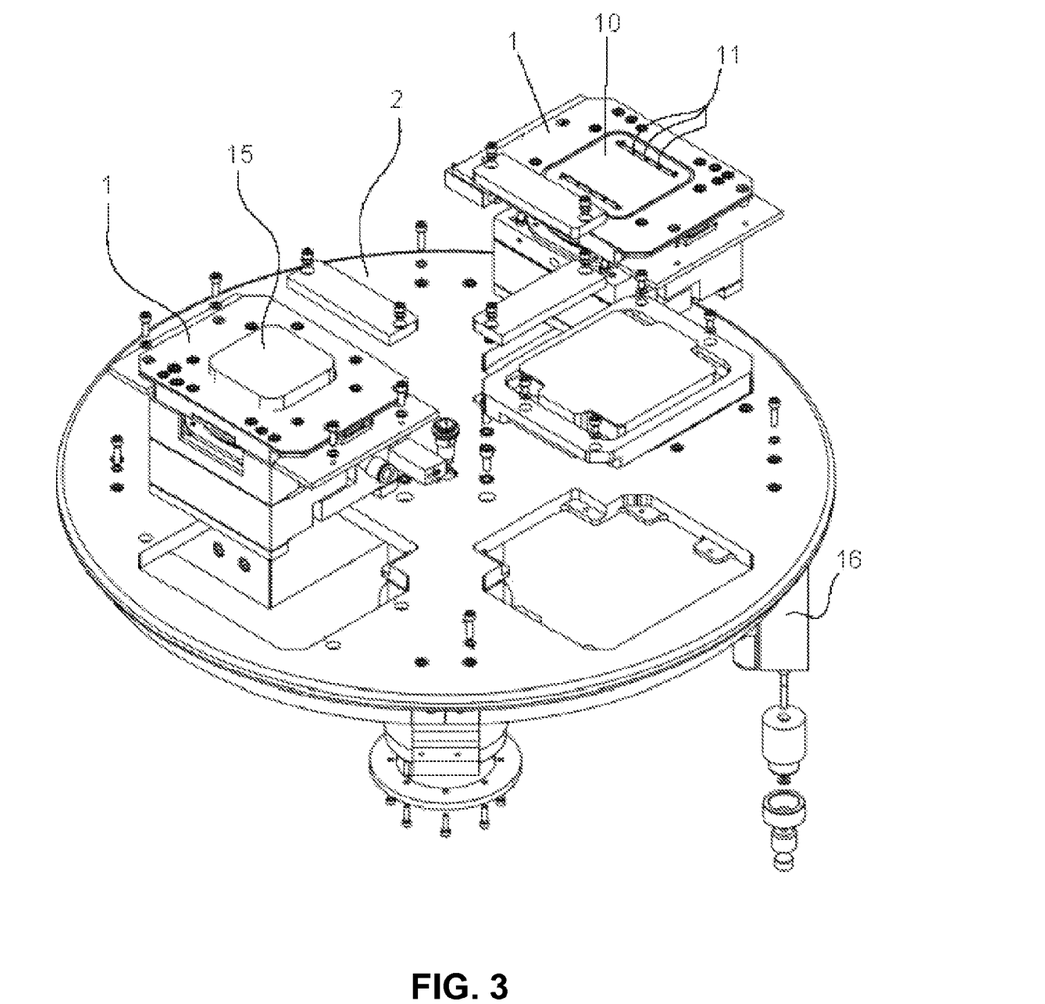
FIG. 3 shows a schematic view of a rotating table according to the preferred embodiment of the invention.
Figure 4:
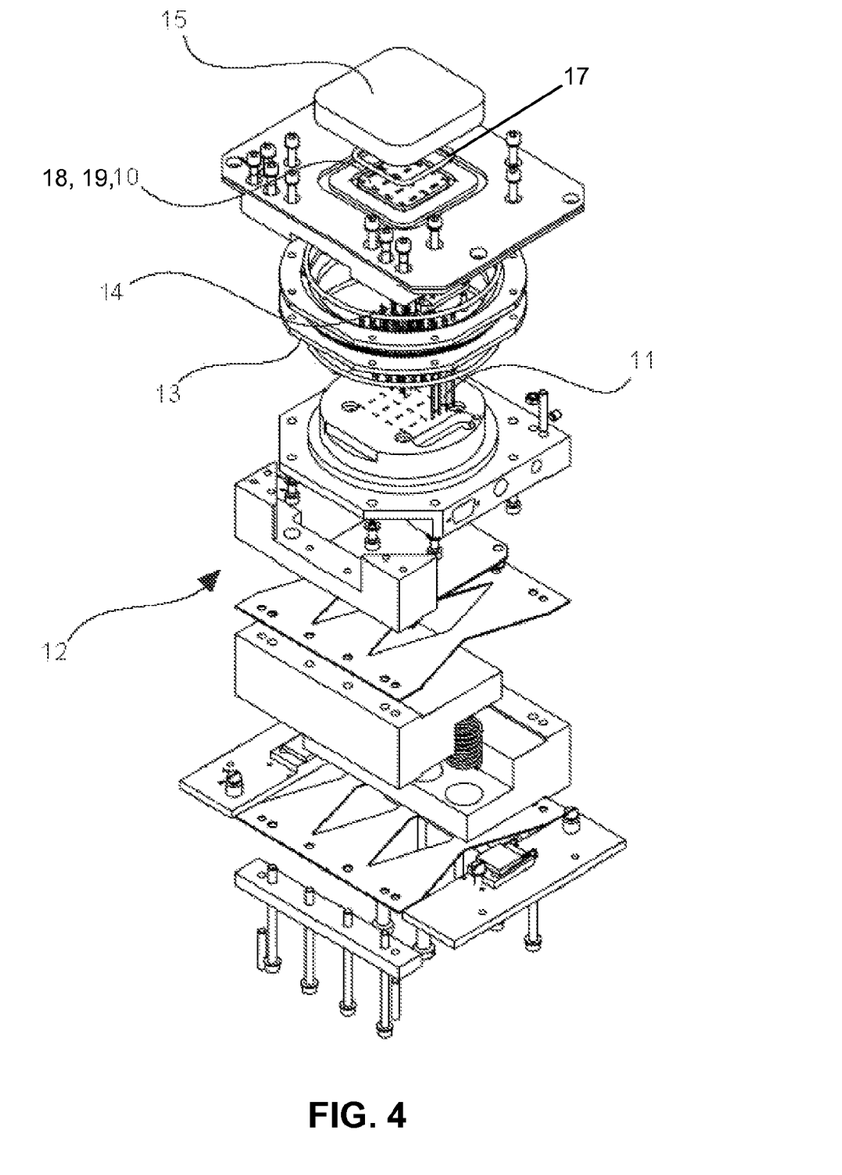
FIG. 4 shows a schematic view of a contacting device according to the preferred embodiment of the invention.
Figure 5:
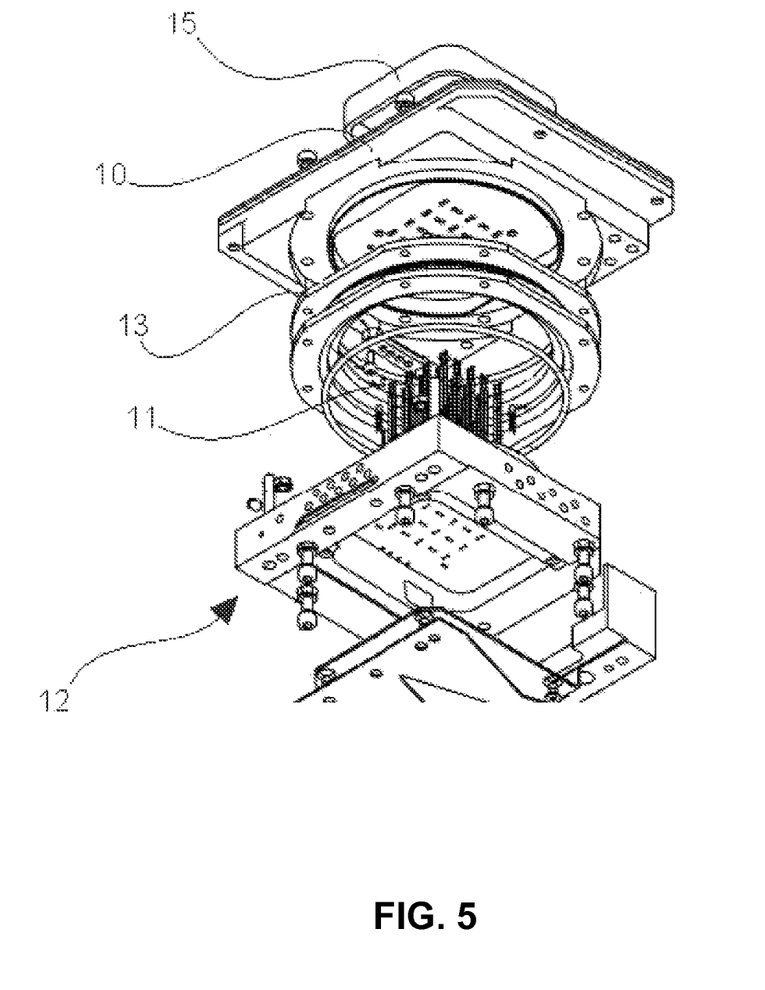
FIG. 5 shows a schematic view of the contacting device according to the preferred embodiment of the invention in another perspective.

The contacting device 1 comprises a positioning plane 10, whereby a solar cell 17 is arrangeable on the top side of the positioning plane 10. The contacting device 1 further comprises a contact element 11 that is arranged slideably in a direction orthogonal to the positioning plane 10 and arranged slideably through an opening, i.e. a bore hole, of the positioning plane 10. The contact element 11 is provided as a plurality of golden contact pins, as can be seen from FIG. 3, for establishing electrical contact with the solar cell 17.

The contacting device 1 furthermore comprises a suction element 12 for sucking air through the opening, wherein the suction element 12 is arranged on the bottom side of the positioning plane 10. The suction element 12 comprises a metal bellow 13 that surrounds the contact element 11 for sucking the air through the borehole of the pins.

In such manner, the contacting device 1 is built in a way that all functions required for establishing electrical contact with the solar cell 17, like contacting, fixation, cooling and vacuum suction, for proper heat transfer, are combined.

As the contact element 11 is arranged slideably through the positioning plane, tips 14 of the pins can be arranged in a position below the top side of the positioning plane 10, e.g. between the top side and the bottom side of the positioning plane 10, such that the pins cannot be damaged because they are in a "secure" position. Only if a solar cell 17 is positioned on the positioning plane 10 and the suction element 12 is activated, the contact to the transparent conductive oxide (TCO) of the solar cell 17 will be accomplished by the contact element 11.

For measuring light and dark current/voltage curves of the solar cell 17, the solar cell 17 provided on the positioning plane 10 can be light-tightly covered with a cover 15. With a switching element, not shown, electrical parameters like short circuit current ($I_{sc}$), short circuit current density ($J_{sc}$), open circuit voltage ($V_{oc}$), power at maximum power point ($P_{mpp}$ or $P_{max}$), current at maximum power point ($I_{mpp}$), voltage at maximum power point ($V_{mpp}$), fill factor (FF), efficiency ($\eta$), serial resistance ($R_s$), shunt or parallel resistance ($R_{sh}$ or $R_p$), diode factor (n), dark saturation current ($I_0$) and dark saturation current density ($J_0$) of the solar cell 17 can be determined.

For obtaining most accurate measurement results, the switching element comprises the following leakage currents and switching specifications:

Leakage current (LOW-CURRENT-LO)<3 pA per 1V voltage difference

Leakage current (LOW-CURRENT-HI)<9 pA per 1V voltage difference

Maximum of switching voltage: 40 V

Maximum of switching current: 500 mA

Lifetime (at 1 V, 10 mA): 108 operating cycles

Humidity: 65% max (at 15° C.-35° C.)

The light source 4 is a class AAA light source with integrated AM1.5 G filter. Additionally, the light distribution can be measured by an array of 9 crystalline photodiodes 9 to assure that the non-uniformity of the light source 4 is within specific values.

A set of 6 filters 7 is integrated in the measurement system to analyze the solar cells under specific light conditions. Spectral filters 7, e.g. KG3, BG7, OG590, RG630, as well as neutral filters, e.g. NG4, NG11, are used for that purpose. Variable Intensity Measurements (VIM) are therefore also possible to perform without changing the intensity of the light source 4 itself. The set of filters 7 is used for either single or double junction thin film silicon solar cells. It is possible to easily change and/or expand filters 7 for specific purposes if necessary. The filters 7 are arranged in the optical path 3 of the light source 4.

The rotating table 2 assures a fast handling of the measurement, analysis and calibration procedures to assure accurate current/voltage measurements with the integrated contacting device 1. On the basis of two calibration positions, i.e. a reference cell 8 measurement position and a photodiode 9 array measurement position, the operator is able to assure that the spectra, the temporal stability and the non-uniformity of the light source 4 is within specifications.

For further assuring accurate measurements, the measurement system comprises a magnetic positioning holder 16 for positioning the rotating table 2 such that the contacting device 1, the reference cell 8 and/or the photodiode 9 array, is exactly arranged in the optical path 3 of the light source 4.

Figure 6:
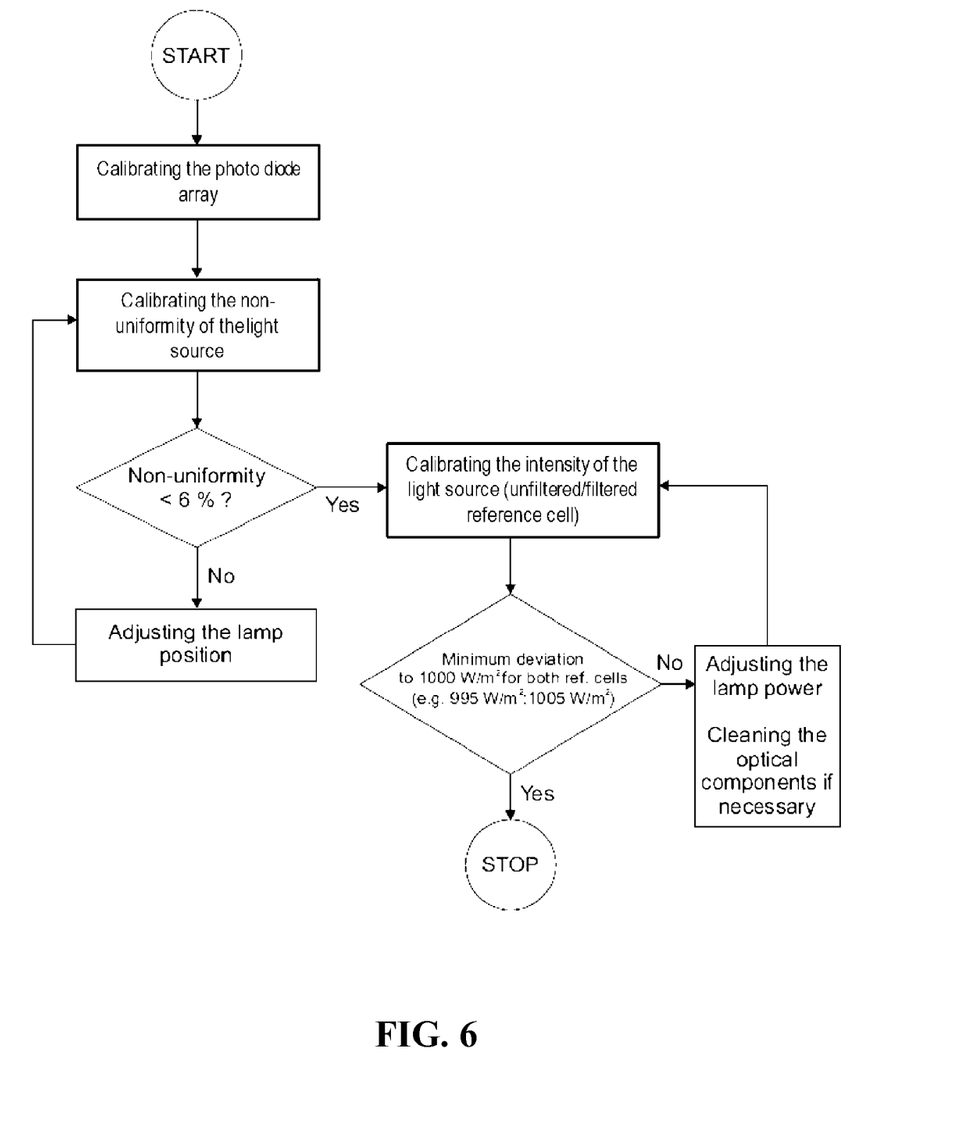
FIG. 6 shows a flowchart of the calibration procedure.

A calibration procedure for the measurement system, which may be predefined, can be supported by software functionalities and may comprise the following steps for obtaining most accurate measurement results:

1. Calibrating the photo diode 9 array (Interval: Approximately 2 months)
2. Calibrating the non-uniformity of the light source 4 (Interval: Approximately 10 days)
3. Calibrating the intensity of the light source 4 (Interval: Approximately 10 days (preferably together with non-uniformity calibration)) Thus, the flowchart of the calibration procedure may be represented in FIG. 6.

Maintenance tasks and intervals may be the following for obtaining most accurate measurement results:

| Maintenance task | Maintenance interval |
| --- | --- |
| Visual inspection of lamps | Monthly |
| Checking screwed fittings at lamp socket | Every six months |
| Checking the lamp fan | Monthly |
| Cleaning the air filter | Monthly |
| Cleaning the optical elements (mirrors, lenses, half mirror) | Quarterly |
| Replacing the lamp | End of lifetime but surely after 2000 operating hours |
| Adjusting the lamp position | Subsequent to lamp replacement or if non-uniformity >6% (Oerlikon Solar recommendation: two week interval) |
| Adjusting the lamp power | Subsequent to lamp replacement or if irradiation deviates more than 2% from STC conditions (Oerlikon Solar recommendation: two week interval) |

The measurement system software, running e.g. on the graphical user interface 5, allows to analyze all measured data in different ways. Histogram functionalities are given to analyze the following parameters of IV-measurements: Short circuit current ($I_{sc}$), short circuit current density ($J_{sc}$), open circuit voltage ($V_{oc}$), power at maximum power point ($P_{mpp}$ or $P_{max}$), current at maximum power point ($I_{mpp}$), voltage at maximum power point ($V_{mpp}$), fill factor (FF), efficiency ($\eta$), serial resistance ($R_s$), shunt or parallel resistance ($R_{sh}$ or $R_p$). Different Plot options (I-V; P-V) can be activated to visualize the measurements being done on the measurement system.

The invention claimed is:

1. Contacting device for a thin film solar cell, comprising:
a positioning plane for positioning the solar cell thereon;
a contact element for electrically contacting the solar cell, the contact element being arranged in a direction orthogonal to the positioning plane and arranged slideably through an opening of the positioning plane, the contact element comprising a tip configured to electrically contact the solar cell, the tip being arranged in a first position between a top side and a bottom side of the positioning plane when the solar cell is not arranged on the top side of the positioning plane, the tip being arranged in a second position within the solar cell when the solar cell is arranged on the top side of the positioning plane; and
a suction element arranged on the bottom side of the positioning plane for sucking air through the opening of the positioning plane.

2. Contacting device according to claim 1, wherein the contact element is adapted for contacting the solar cell when the solar cell is arranged on the top side of the positioning plane and when the suction unit sucks air through the opening.

3. Contacting device according to claim 1, wherein the contact element comprises a golden pin for contacting the solar cell.

4. Contacting device according to claim 1, comprising a cover configured to light-tightly cover the solar cell when arranged on the top side of the positioning plane.

5. Contacting device according to claim 1, wherein the contact element is configured to contact the solar cell when the solar cell is arranged on the top side of the positioning plane and when the suction unit sucks air through the opening and wherein the contacting device comprises a cover configured to light-tightly cover the solar cell when arranged on the top side of the positioning plane.

6. Contacting device according to claim 1, comprising a temperature element configured to cool and/or heat the contacting device and a peltier element configured to measure a temperature of the contacting device, wherein the temperature element is controlled by the peltier element.

7. Measurement system for a thin film solar cell, comprising a contacting device according to claim 1, a light source and a rotating table, wherein the contacting device is arranged on the rotating table such that the top side of the positioning plane of the contacting device is rotatable into the optical path of the light source.

8. Measurement system according to claim 7, wherein the contact element is configured to contact the solar cell when the solar cell is arranged on the top side of the positioning plane and when the suction unit sucks air through the opening.

9. Measurement system according to claim 7, comprising a cover configured to light-tightly cover the solar cell when arranged on the top side of the positioning plane.

10. Measurement system according to claim 7, wherein the contact element is configured to contact the solar cell when the solar cell is arranged on the top side of the positioning plane and when the suction unit sucks air through the opening and wherein the contacting device comprises a cover configured to light-tightly cover the solar cell when arranged on the top side of the positioning plane.

11. Measurement system according to claim 7, comprising a filter, wherein the filter is arranged in the optical path of the light source.

12. Measurement system according to claim 7, comprising a reference cell and/or a photo diode array, wherein the reference cell and/or the photo diode array, respectively, is arranged on the rotating table such that the reference cell and/or the photo diode array, respectively, is rotatable into the optical path of the light source.

13. Measurement system according to claim 7, comprising a magnetic positioning holder configured to position the rotating table such that the contacting device is arranged in the optical path of the light source.

14. Measurement system according to claim 7, comprising a low current switching element configured to measure current and/or voltage of the solar cell.

15. Measurement system for a thin film solar cell, comprising:
    a contacting device for a thin film solar cell, the contacting device comprising a positioning plane, a contact element, and a suction element, the positioning plane being configured to position the solar cell thereon, the contact element being arranged slideably in a direction orthogonal to the positioning plane and arranged slideably through an opening of the positioning plane, the contact element comprising a tip configured to electrically contact the solar cell, the tip being arranged in a first position between a top side and a bottom side of the positioning plane when the solar cell is not arranged on the top side of the positioning plane, the tip being arranged in a second position within the solar cell when the solar cell is arranged on the top side of the positioning plane, the suction element being arranged on the bottom side of the positioning plane, the suction element being configured to suck air through the opening;
    a second contacting device for a second thin film solar cell, the second contacting device comprising a second positioning plane, a second contact element, and a second suction element, the second positioning plane being configured to position the second solar cell thereon, the second contact element being configured to electrically contact the second solar cell, the second contact element being arranged slideably in a direction orthogonal to the second positioning plane and arranged slideably through a second opening of the second positioning plane, the second contact element comprising a second tip configured to electrically contact the second solar cell, the second tip being arranged in a first position between a top side and a bottom side of the second positioning plane when the second solar cell is not arranged on the top side of the second positioning plane, the second tip being arranged in a second position within the second solar cell when the second solar cell is arranged on the top side of the second positioning plane, the second suction element being arranged on the bottom side of the second positioning plane, the second suction element being configured to suck air through the second opening;
    a light source; and
    a rotating table, the contacting device being arranged on the rotating table such that the top side of the positioning plane of the contacting device is rotatable into an optical path of the light source, the second contacting device being arranged on the rotating table such that the top side of the second positioning plane of the second contacting device is rotatable into the optical path of the light source.

16. A contacting device for a thin film solar cell, comprising:
    a positioning plane configured to position the solar cell thereon, the solar cell being arranged on a top side of the positioning plane;
    a contact element configured to electrically contact the solar cell, the contact element being arranged slideably in a direction orthogonal to the positioning plane and arranged slideably through an opening of the positioning plane;
    a suction element arranged on a bottom side of the positioning plane, the suction element being configured to suck air through the opening of the positioning plane; and
    a cover configured to light-tightly cover the solar cell.

17. A contacting device for a thin film solar cell, comprising:
    a positioning plane configured to position the solar cell thereon, the solar cell being arranged on a top side of the positioning plane;
    a contact element configured to electrically contact the solar cell, the contact element being arranged slideably in a direction orthogonal to the positioning plane and arranged slideably through an opening of the positioning plane;
    a suction element arranged on a bottom side of the positioning plane, the suction element being configured to suck air through the opening of the positioning plane;
    a temperature element configured to cool and/or heat the contacting device; and
    a peltier element configured to measure a temperature of the contacting device, the temperature element being controlled by the peltier element.

* * * * *